Nov. 28, 1933.  N. MILLER  1,937,353
OPTIC PROJECTION
Filed June 3, 1927    6 Sheets-Sheet 1

Inventor
Nicholas Miller

Inventor
Nicholas Miller

Nov. 28, 1933.　　　　N. MILLER　　　　1,937,353
OPTIC PROJECTION
Filed June 3, 1927　　　6 Sheets-Sheet 4

Inventor
Nicholas Miller

Nov. 28, 1933.　　　N. MILLER　　　1,937,353

OPTIC PROJECTION

Filed June 3, 1927　　　6 Sheets-Sheet 5

Inventor
Nicholas Miller

Nov. 28, 1933. N. MILLER 1,937,353
OPTIC PROJECTION
Filed June 3, 1927  6 Sheets-Sheet 6

Inventor
Nicholas Miller

Patented Nov. 28, 1933

1,937,353

UNITED STATES PATENT OFFICE 1,937,353

OPTIC PROJECTION

Nicholas Miller, Hartford, Conn.

Application June 3, 1927. Serial No. 196,252

18 Claims. (Cl. 88—16.8)

This device belongs to that class of optical projectors in which the film is continuously moved past an aperture and the movement of the film image is compensated for by movable optical elements disposed between the film aperture and the screen. The mechanically simplest arrangements that have been proposed consist of a series of optical elements (reflectors, prisms, or lenses) arranged equidistantly and in a fixed relation about a revolving axis, and the film is moved by a sprocket fastened directly to, or geared to said axis. In devices of the above class a difficulty arises from the fact, that it is not possible to precisely compensate for the movement of a picture image by the movement of one series of optical elements about a common axis, except by using a prohibitively large number of optical elements. To overcome this difficulty, two or more series of optical elements revolving about common axes have been proposed, for by such means a greater precision in optical compensation can be obtained; but the number of optical elements required is still too large and the cost of such devices prohibitive. Other difficulties arise from the fact, that in most of these devices there is a scarcity of space, for the accommodation of the objective and other necessary optical devices, and there is an interference of light rays by the adjacent optical elements unless a large number of them are used.

Another method for obtaining more precise compensation with a comparatively few optical elements is to impart to the optical elements an independent movement while they revolve about a common axis during the time they pass through the active zone.

The simplest of this type is a series of reflectors pivotally mounted about a common axis, the rocking movement of the reflectors being usually obtained by means of a lever arm of the reflector holder co-acting with a fixed cam having the proper contour. It is well known that the "steadiness" of a projected screen image is impaired, if it deviates from its true position by more than ⅛". In modern projection practice ⅛" at the screen subtends an angle of about 18 seconds at the objective, and as a reflector will cause a ray to be angularly displaced twice its own angular displacement, it follows that the movement of the reflector must not deviate from its true position in the active zone by more than 9 seconds. From this the precision required for the moving of the reflectors will be apparent, and the limitations of mechanical precision in practice attainable determines the limits or size of certain of the mechanical connections. Thus if it be assumed that the cumulative mechanical inaccuracies transmitted to the rocking reflector can be held within about .0005, then the lever arm for the pivoted reflectors could not be less than 10" to 12". But such lever arms on a series of pivoted reflectors mounted about a common axis are not practicable unless a relatively large number of reflectors of large dimensions are employed. Further it is desirable that the path of the adjacent reflectors in the active zone be in a substantially straight line or a relatively large arc, for otherwise there is likely to be interference produced to the passage of the light rays from one reflector by the edges of the adjacent reflectors. One of the purposes of the present invention is to attain the above stated desirable results with a relatively small number of reflectors mounted to revolve about a common axis. By means disclosed in the present invention the lever arms controlling the angular movement of the reflectors are not limited in length, but are of any length which the results desired may require, and is independent of the size or of the number of reflectors used.

The movement imparted to the lever arms is controlled by a cam which is common to all of the lever arms. This cam is made manually adjustable and thereby the motion imparted to the reflectors is varied. The purpose of this adjustment is to compensate for the slight variation in the "pitch" of adjacent film images (of different films) and to adjust the apparatus to variations existing in the focal distances of the objective as determined by the length of throw and the focal length of the objective. For objectives, differing considerably in focal length, different size cams may be used, the rest of the structure remaining the same; this feature of adapting the apparatus to objectives of different focal lengths (and therefore to the conditions of different theatres or places of projection) by the change of only one member is of considerable practical importance.

In devices of this class it is difficult to construct the various mechanical connections in the precise relations required, and therefore further adjustments are provided whereby the slight mechanical inaccuracies are compensated for by adjusting the adjacent reflectors relative to one another.

Another improvement consists in the means for controlling the light beam before it reaches the film image, and the principles involved and means provided are similar to that disclosed in my issued Patent No. 1,530,903. The main purposes of the light controlling system are: (1) To produce a uniform illumination of the film images; (2) To maintain the picture rays of adjacent picture images separated.

As is explained in the above patent, the above purposes can be attained by focusing a light controlling optical element, (such as a reflecting or a refracting element) continuously and successively, substantially upon the film images, the size of the optical elements being restricted to a section of the marginal rays belonging to a picture image; and at the same time an image of the source is projected substantially to the nodal plane of incidence of the objective. In the present invention the light controlling elements, or reflectors are likewise focused substantially upon the picture images, but the image or images of the source are focused not upon the nodal plane of incidence of the objective, but beyond it, and preferably upon the corresponding compensating reflectors; by this means the picture rays of adjacent film images are effectively maintained separated, and this result is independent of the distribution or intermingling of the rays at the objective. For the purposes of the present invention an important advantage results by the present method proposed, in that the diameter of the objective is not required to be as large as in the former case and also that a better definition of the screen image is possible.

The lens system required for directing the light rays to the film images, the objective, and the compensating reflectors can be considered conveniently in two groups. The first group is for the purpose of collecting a maximum quantity of light rays from the source and of producing a real image of the source; this group is positioned in front of the light controlling reflectors. The second group is a system of lenses which project a real image of the light controlling reflectors substantially upon the film images, and simultaneously project the image of the source formed by the first group of lenses substantially upon the compensating reflectors. For the first group any well known system may be used, but for the second group I propose a system composed of but two lenses of definite focal lengths and in predetermined positional relation with respect to the light reflectors, film aperture and objective and related to the magnification ratios existing between the light reflectors relative to the film images, and between the source image produced by the first group of lenses, and the final source image that is projected upon the compensating reflectors.

Other novel and useful improvements will be pointed out in the specification and the appended claims.

(Fig. 7).

Fig. 12 is a section of the link mechanism for the guiding of the reflectors. It is an enlarged section taken on line 12—12; (Fig. 7), but turned 90°, so that the effective positions of the various elements face upward instead of toward the right as in Figs. 6 and 7. The reflecting members are omitted on this view.

Fig. 14 is a partial sectional view on line 14—14 (Fig. 13), showing the cams on the end of the fixed shaft 3.

Figs. 1 to 5 diagrammatically represent the projecting system, with all unessential optical elements omitted. The compensating reflectors $R_1$, $R_2$, etc., are shown arranged about an axis A and their axes or pivots travel in a fixed path P. O is the objective, F is the film at the aperture, $L_2$ and $L_1$ are lenses in front of the film; $R_1^1$, $R_2^1$, etc., are the light directing reflectors and their axes or pivots travel in the path $P^1$ in the direction of the arrow, the whole system revolving about the axis $A^1$. L is the condensing lens system and S is the source of light.

Figure 1:
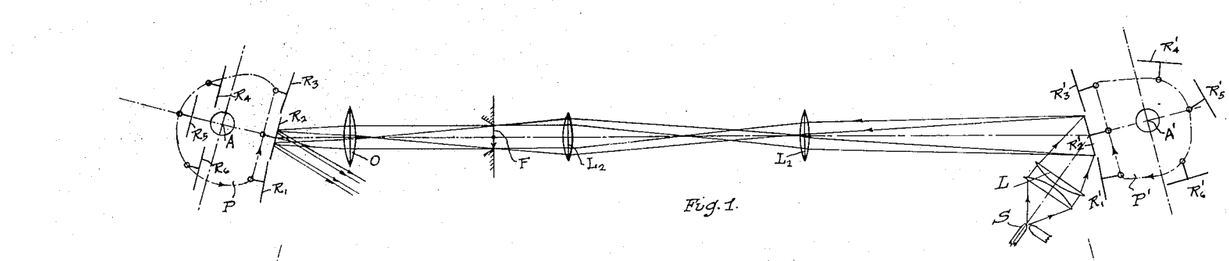
Figs. 1, 2, 4, and 5 are diagrammatic representations of the principles underlying the invention, with all unessential optical elements omitted.

In Fig. 1 a complete film image is shown in position in the aperture, and the marginal rays from the reflector $R_2^1$ are seen to converge or focus upon the margins of the film image by the lenses $L_1$ and $L_2$. Intermediate points from the reflector $R_2^1$ are likewise focused to corresponding intermediate points of the film image, so that the film image receives only the light which is incident on and is reflected from the reflector $R_2^1$. The cone of rays emerging from the condensers L covers all parts of the reflector $R_2^1$.

Figures 2, 3, 4, 5:
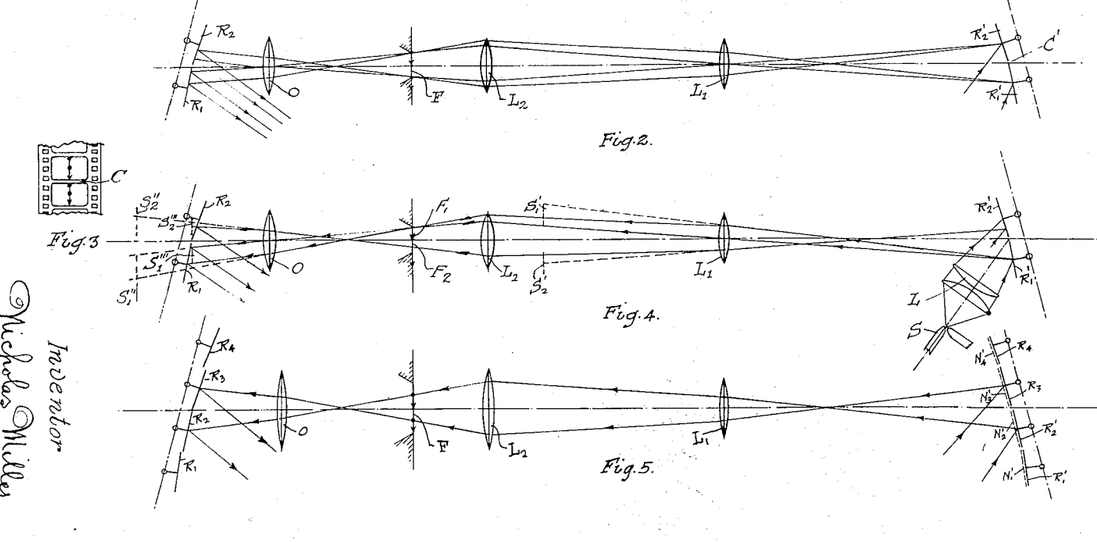
Fig. 3 illustrates a portion of the film, showing the clearance space between adjacent pictures.

Fig. 2 represents the relation of the film and the reflectors, when one-half of two adjacent picture images is exposed in the aperture, and where the screen image is made up of complementary halves of two adjacent film images. In this instance the middle line of the picture images will coincide with the edges of the aperture, and it will be the middle line of the light directing reflectors which will be focused upon the middle lines (or the aperture edges) of the picture images, while the edges of the light directing reflectors $R_1^1$ and $R_1^2$, will be focused on the edges of their respective picture images. The clearance $C^1$ between the edges of adjacent reflectors $R_1{}^1$ and $R_2{}^1$ corresponds to a space C that exists between adjacent film images shown in Fig. 3. In Fig. 1, reflector $R_2{}^1$ is completely illuminated and intercepts all of the available light issuing from the condensers L, and the illuminated surface of $R_2{}^1$ is focused by the lenses $L_1$ and $L_2$ upon the complete film picture at F. In Fig. 2, two reflectors are in the light field of the condensers, and one half of each of the reflectors $R_1{}^1$ and $R_2{}^1$ are illuminated, and are focused by the lenses $L_1$ and $L_2$ upon corresponding parts of two adjacent film pictures at F, so that these partial film pictures, which are complementary and produce the complete screen picture, receive exactly the same amount of illumination as did the single film picture in Fig. 1. The clearance $C^1$ (Fig. 2) between the reflectors correspond at all times to the clearance C (Fig. 3), between the film pictures, so that it cannot influence the illumination on the screen. Thus, according to these principles, a constant illumination of the film pictures and therefore an entire absence of the "flicker" effect of the projected screen image is obtained.

The final image of the source S is projected by the lens system L, and lenses $L_1$ and $L_2$, through the film F to the objective O, and by the objective substantially upon the compensating reflectors $R_1$ $R_2$ as shown in Fig. 4. Here $S_1{}^1$ and $S_2{}^1$ represent the images of the source formed by the lens system L and reflected by the reflectors $R_1{}^1$ $R_2{}^1$. Lenses $L_1$ and $L_2$ form the images $S_1{}^{11}$ and $S_2{}^{11}$, and the objective images $S_1{}^{111}$ and $S_2{}^{111}$, which are on, or in close proximity to, the compensating reflectors $R_1$ and $R_2$. It will be seen that the marginal rays intersect at the edges of the film aperture and at the final image $S_1{}^{111}$ and $S_2{}^{111}$ of the source, so that all of the rays passing through a picture will also pass through its corresponding source image. The rays passing through the final source diverge, and rays belonging to adjacent picture images will approach each other during their travel toward the screen, and therefore the projection of the final image source upon, or in the proximity of the compensating reflectors is an advantageous arrangement for maintaining the picture rays of adjacent picture images separated.

In order to project the images of the light directing reflectors $R_1{}^1$ and $R_2{}^1$ upon corresponding film pictures $F_1$ and $F_2$ (Fig. 4), and simultaneously the images of the luminous part of the source S upon corresponding compensating reflectors $R_1$ and $R_2$, the focal length of the lens combination $L_1$ and $L_2$ and their disposition between the light directing reflectors and the film picture aperture must be definitely related to the various magnitudes and positions of the source, the light directing reflectors, the film picture aperture, the objective, and the compensating reflectors. In place of the two lenses $L_1$ and $L_2$ a single lens of equivalent focal length may be substituted; a two lens system is, however, preferable, in that a lesser distance between the light directing reflectors and the film picture aperture is required; also the lenses are smaller in diameter and in thickness than a single lens would be.

Fig. 5 represents one application of the present device to projection in natural colors. The aperture opening embraces two whole film pictures in which case two adjacent picture images are simultaneously, and successively projected on the screen in superposed relation. According to the well known color process based on the primary color theory, it is only necessary to provide the successive picture images with the proper complementary color values to obtain projection in natural colors. This can conveniently be accomplished by the coloring of the successive glass mirrors $R^1$, $R_2{}^1$, etc. (silvered on the back surface) with the proper complementary colors, or by attaching in front of them the transparent color filters $N_1{}^1$, $N_2{}^1$, etc., of the proper colors. Either two color values, such as red and green-blue filters may alternate, in which case a completely blended picture will continuously be projected on the screen or the three primary colors, red, green and blue-violet may be used, in which case the blending of colors would be partially dependent upon the persistence of vision, unless the apparatus was adapted to an aperture opening of three adjacent film pictures.

Figure 6:
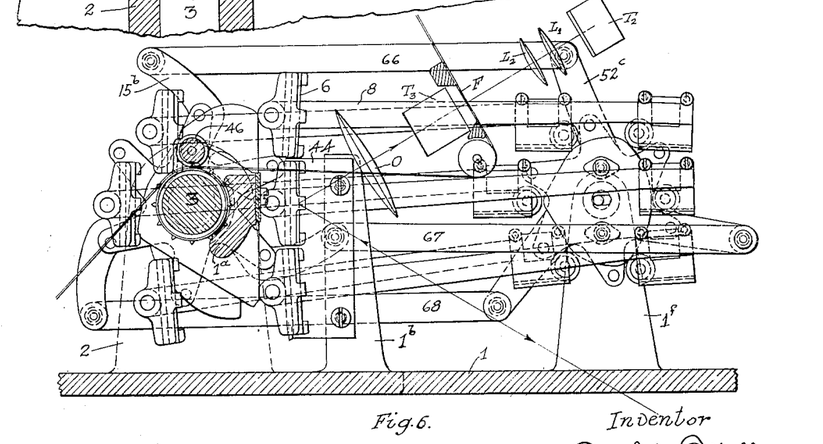
Fig. 6 shows a partial sectional front view of the apparatus on the line 6—6.
Figure 7:
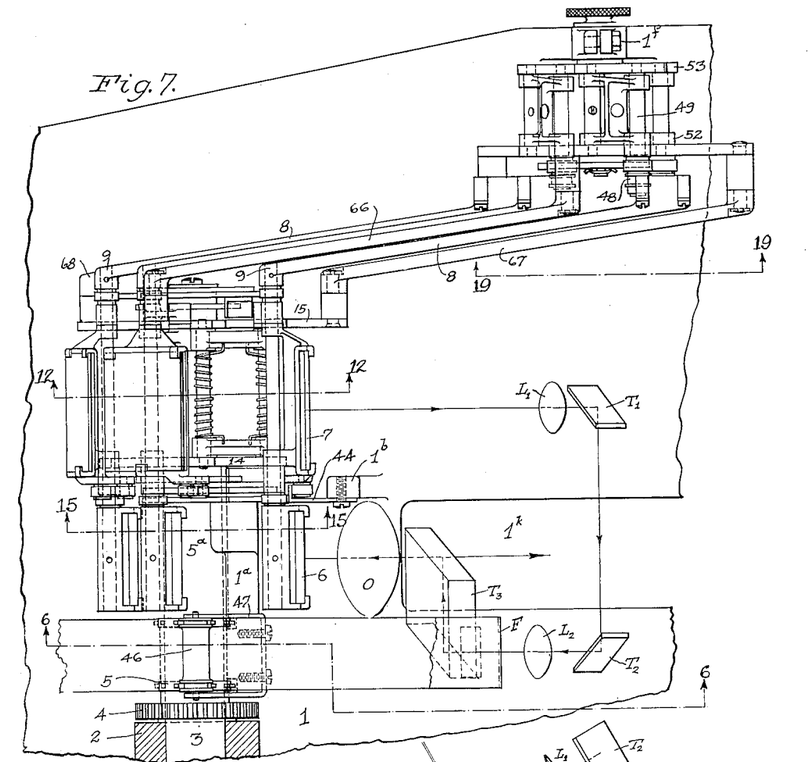
Fig. 7 is a top view of the apparatus on a reduced scale.

In Figs. 6 and 7, 1 represents the base; 2 is an upright bracket integral with the base and it rigidly supports at its upper end a horizontal shaft 3; upon this shaft are rotatably mounted the driving gear 4, the film feeding sprocket 5, the compensating reflectors 6, the light directing reflectors 7, together with their supports and mechanisms. The lever arms for rotating the compensating reflectors are shown at 8 and the mechanism for actuating the lever arms is shown at the upper right hand corner of Fig. 7. The compensating reflectors as well as the light directing reflectors travel preferably in a straight path (or in an arcuate path of comparatively large radius), and the rate of travel of the reflectors in the active zone is uniform, or nearly so, in order to maintain a desirable small clearance between the adjacent reflectors.

Figure 8:
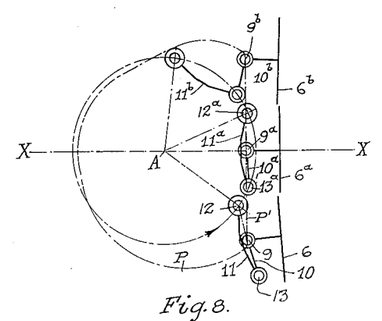
Fig. 8 is a diagrammatic illustration of the linkage mechanism for guiding the reflectors in a predetermined path.

In Fig. 8, 9 represents a shaft upon which the compensating reflectors are rigidly mounted; this shaft is rotatably supported in the free end of a short-link 10, which is in turn hinged in the free end 13 of another (longer) link 11. Link 11 is pivotally mounted at 12 on a support revolving about a fixed axis A. In the present illustration of the invention six reflectors are shown mounted about axis A, and three of these may simultaneously occupy the active zone as shown at 6, $6^a$, and $6^b$. The action of the links in guiding the shaft 9 is as follows: The support revolves about the axis A in the direction of the arrow, while the shaft 9, short-link 10 and link 11 are held (by means which will hereinafter be described) in a fixed relation, the whole system being movable as a unit about the pivot 12. The shaft 9 is guided in the path P, which in the active zone is straight, as at $P^1$. If pivot 12 moves in its arc to $12^a$, shaft 9 will move to $9^a$, and to a uniform rate of travel of the pivot 12 will correspond a nearly uniform travel of the shaft 9, that is the velocity ratio will be very nearly constant. At the position of the shaft $9^a$ the link $11^a$ is tied to (or made integral with) the revolving support, and upon further movement the short-link $10^a$ is freed to move about its pivot at $13^a$, and when the shaft arrives at $9^b$ the links will assume their relative positions shown at $10^b$ and $11^b$.

Now, if the proportions of the two links are such that the length of the short-link 9—13 is equal to the distance 9—12, then the action of the short link above the center line "XX" will be similar to the action of the long link below the center line "XX", (with respect to the movement of the shaft 9). Thus by this double linkage the effective travel of the shaft will be double of that which could be obtained by a single link. A single link like link 11, itself rotatably supporting the shaft 9, could be used but the dimensions of the various parts would have to be considerably larger; for smaller size of films, the translation of the shaft 9 would be correspondingly less and for certain purposes a single link mechanism could be used advantageously.

Figures 12, 14:
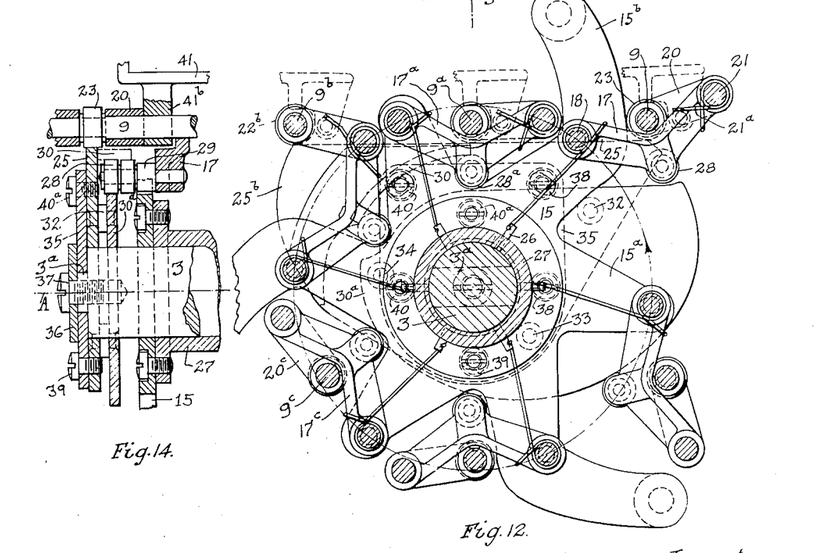
Figure 13:
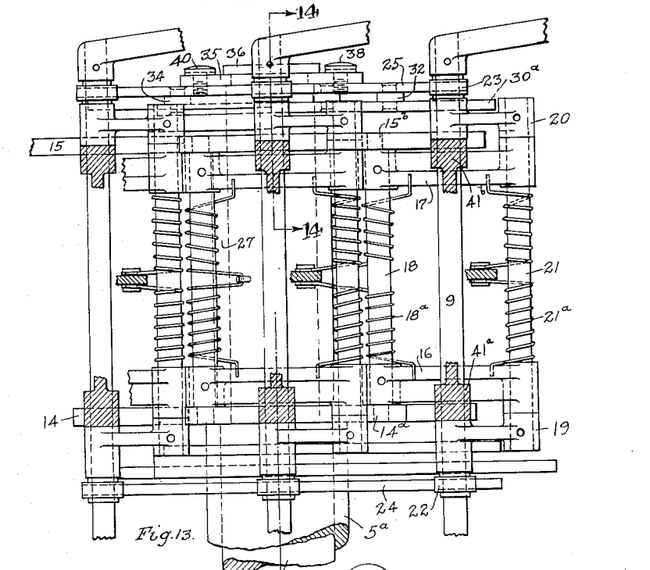
Fig. 13 is a top view of Fig. 12.

The structure of the link mechanism is shown in Figs. 12, 13, and 14.

Two spaced supports, 14 and 15, are fastened on the flanged ends of a tubular member 27 and are provided with six uniformly spaced arms such as 14$^a$ and 15$^a$, but on the support 15 the alternate arms are longer as shown at 15$^b$, for the purpose hereinafter to be described. The links consist of two arms 16 and 17 spaced on and pinned to a rod 18, the end of said rod pivoting in the arms of the supports 14 and 15. Similarly the short-link consists of two spaced members 19 and 20 pinned to a rod 21, by which it hinges in the free ends of arms 16 and 17. The shaft 9 is rotatably mounted in the free end of the short-links 19 and 20, and is provided with two rollers 22 and 23, which cooperate with fixed cams 24 and 25. The short-link is provided with a torsion spring 21$^a$ on rod 21 which tends to hold the shaft 9 yieldingly in a fixed relation with the arms 16 and 17; another spring 18$^a$ on rod 18 anchored at one end to a pin 26 on the member 27, tends to turn the link composed of the arms 16 and 17 toward the tubular member 27. The spring 21$^a$ is under a considerably greater stress than the spring 18$^a$, so that normally the two links consisting of the arms 16, 17 and 19, 20 will act as a single link turning about the rod 18 in the arms of the supports 14 and 15. Thus the effect of the spring 18$^a$ is to hold the rollers 22 and 23 in contact with the cams 24 and 25. The effective contours of the cams 24 and 25 are straight and the shaft 9 will be guided by the link arms 16 and 17, and the rollers 22 and 23 in contact with the straight portions of the cams. This construction is particularly adapted to obtain a high degree of precision in the movement of the shafts, for the pivotal movements of the links can be produced with little or no lost motion and the straight portion of the cams, as well as the rollers and rotating parts can be made with great accuracy. The spaced cams, supports and springs are likewise designed to so distribute the various stresses that the resulting lost motions and distortions shall be negligible.

Figures 17, 18:
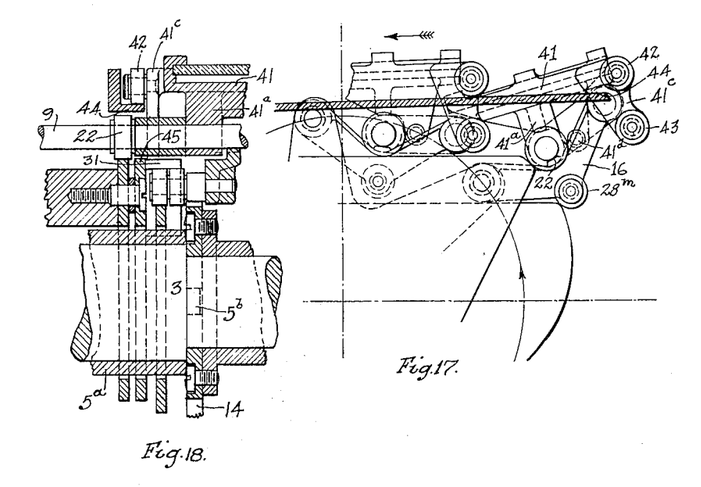
Fig. 17 shows the link mechanism for the guiding of the reflectors, in an operative position.
Fig. 18 is a partial sectional view on line 18—18 (Fig. 15).

It has been explained in connection with the diagram of Fig. 8 that the shaft 9 is guided by link arms 16 and 17 to the middle point of its path at 9$^a$, and at that point link arms 16 and 17 are rendered integral with the revolving supports 14 and 15 and the shaft 9 is guided from there on by the short-link arms 19 and 20. To accomplish this, the arms 16 and 17 are provided with rollers 28 which are supported by studs 29 projecting outwardly from said arms and cooperating with a fixed arcuate projection 30 and 31, shown in Figs. 12, 14, 15 and 18. In Fig. 12 when the shaft is in position 9$^a$, the rollers will be in position 28$^a$ in engagement with arcuate projection 30 and thereby holding arm 17$^a$ in a fixed relation with the revolving support 15, against the stress of the spring 21$^a$, and upon the further revolving of the support 15 the short-link arms 19 and 20 will separate from link arms 16 and 17 against the stress of the spring 21$^a$, due to the rollers 22 and 23 pressing upon the cam surfaces 24 and 25. When the shaft reaches the position 9$^b$, Fig. 12, the roller 28 is moving out of contact with the arcuate cam projection 30 and simultaneously the roller 22$^b$ will be descending upon the cam portion 25$^b$, so that the two link-arms and the shaft approach each other to assume their initial relations as shown at 9$^c$, 17$^c$ and 20$^c$. Before the link-arms approach their initial position (as at 17) a point is reached when the roller 28, and the roller 23 of the shaft will engage their respective cams simultaneously; this is shown in Fig. 17; when the shaft resumes its active initial position as shown at 9, Fig. 12, the roller 23 will contact with its cam, while the roller 28 will be free from its cam until it reaches the mid-position 28$^a$. The cams 25 and 30$^a$, Figs. 12, 13 and 14, are fastened together by spaced rivets 32, 33 and 34, and both cams are supported upon the fixed shaft 3, and provided with an adjustment whereby the cam 25 can be precisely aligned with the opposite cam 24. For this purpose a plate 35 is provided which is held rigidly on the milled end 3$^a$ of the shaft 3 by a washer 36 and screw 37. The cam 25 is held on this plate by screws 38, 39, 40 and 40$^a$, and the slightly elongated holes for the screws in the plate 35 permit the adjustment of the cams about the fixed shaft 3. The support for the opposite cams 24 and 45 will hereinafter be described.

Figure 15:
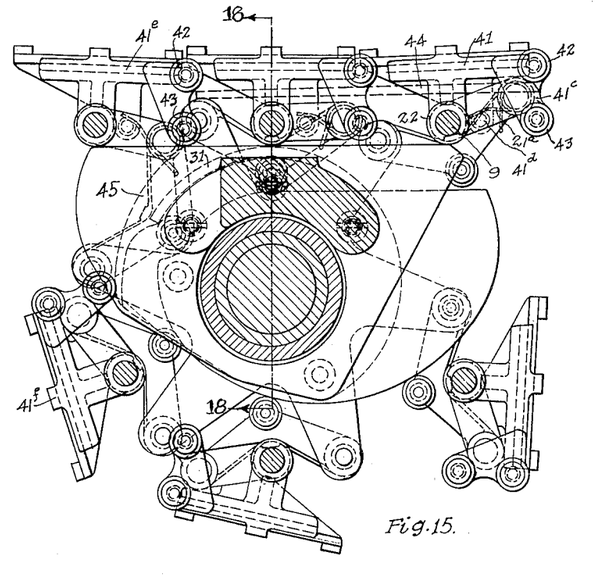
Fig. 15 is a view similar to Fig. 12, but taken on line 15—15 (Fig. 7), showing the cams fastened to the lug $1^a$ of the base; it also shows the light directing reflectors and their holder; compensating reflectors not shown.
Figure 16:
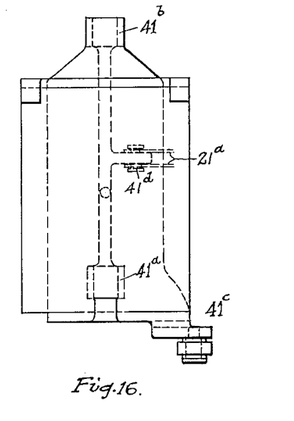
Fig. 16 is a top view of the light directing reflector and its holder.

The structure and operation of the light directing reflectors is shown in Figs. 15, 16, 17 and 18. Upon the shaft 9 and between the short-link arms 19 and 20 are mounted for rocking movement reflector holders 41 by lugs 41$^a$ and 41$^b$ (see also Figs. 12 and 13). Each reflector holder is provided on one of its outside edges with a downwardly projecting lug 41$^c$ upon which are mounted two rollers 42 and 43. The upper roller is adapted to cooperate with the straight edge of a fixed cam 44, which has an L shape cross section (Fig. 18) and projects between rollers 22 and 42. On the underside of the reflector holder studs 41$^d$ are provided to receive the ends of the torsion springs 21$^a$ and said springs normally hold the reflector holder against the short-link arm as shown in Fig. 15. As the reflector holder progresses in the direction of the arrow, the upper roller contacts with the cam 44, and rocks the reflector holder against the tension of the spring 21$^a$. When the reflector holder advances to the position 41$^e$, Fig. 15, the roller 42 will be at the end of the cam 44, and the lower roller 43 will simultaneously contact with a cam 45 (Figs. 15 and 18) and through this cam the reflector holder is guided to resume its initial relation with respect to the link arms, as shown at 41$^f$. In Figs. 6 and 7 the cam 44 is shown fastened to a lug 1$^b$ of the base 1.

The sprocket 5, Figs. 6 and 7, has a tubular extension in both directions upon the shaft 3, and on one side of its extension it carries the gear 4, through which power is transmitted to the apparatus by any known means, not shown. The extension of the sprocket 5$^a$ is connected or keyed to the revolving support 14, shown at 5$^b$ in Fig. 18, so, that a force transmitted through gear 4 will turn the sprocket and revolve the spaced supports 14 and 15 on the fixed shaft 3. Above the sprocket 5 is a roller 46, (Figs. 6 and 7) pivotally supported on the arms of a bracket 47, which is fastened to the lug 1$^a$, and its purpose is to hold the film in contact with the sprocket.

The means for rotating the shafts 9 simultaneously with their movement about the axis of shaft 3 will now be described.

Figures 19, 22, 23:
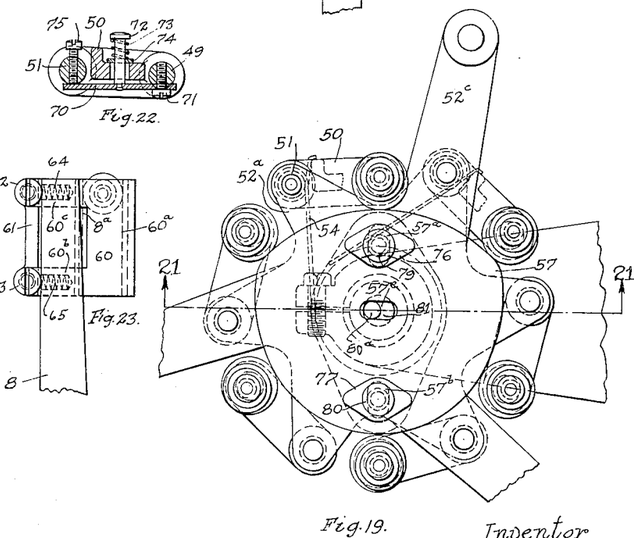
Fig. 19 is a partial front view of the mechanism which determines the angular relation of the compensating reflectors, in direction 19—19 (Fig. 7), but turned 90°, so that the effective part of the mechanism faces upward.
Fig. 22 is a sectional view on line 22—22 (Fig. 20).
Fig. 23 is a partial front view of the end of a lever arm for the compensating reflectors.
Figure 20:
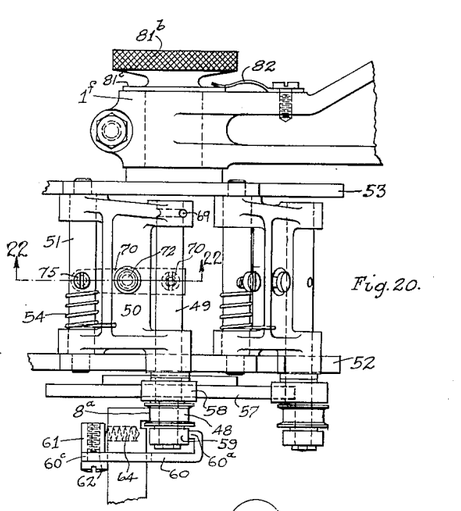
Fig. 20 is a partial top view of Fig. 19.
Figure 21:
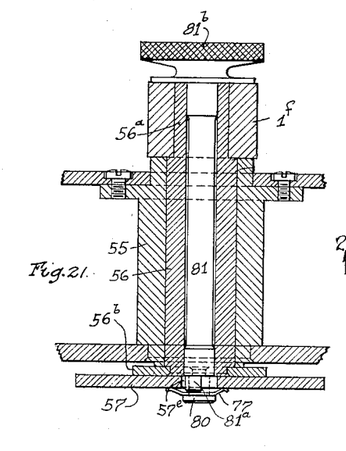
Fig. 21 is a partial sectional view on line 21—21 (Fig. 19).

In Fig. 7 each shaft 9 is provided with a relatively long lever 8, cooperating at its other end with projecting members, which in this instance are rollers 48, mounted upon a rod 49. The structure of this mechanism is shown in detail in Figs. 19 to 24. In Figs. 19 and 20 the rod 49 is shown as supported on a bracket 50 which is pivotally supported at its other end by means of a shaft 51, in the spaced supports 52 and 53.

The supports 52 and 53 are provided with a series of six equidistantly spaced arms as 52$^a$, (Fig. 19), but on the support 52 the alternate arms are elongated as at 52$^c$ for the purpose hereinafter to be described. The supports 52 and 53 are rigidly fastened to the ends of a tubular member 55 (Fig. 21), which is rotatably mounted upon another fixed tubular member 56. The rear end 56$^a$ of member 56 is rigidly held in a bracket 1$^f$ which is integral with the base 1 (Figs. 6 and 7). On the front end of the tubular member 56, a flange 56$^b$ is provided, and on this flange is supported a cam 57 which cooperates with a roller 58 on rod 49, by means of the spring 54 which tends to hold the roller 58 continuously in contact with the cam.

The cam 57 being relatively fixed, a rotation of the supports 52 and 53 will cause the roller 58, and thereby roller 48 to move in a predetermined path. One end of the lever arms 8 engage the rollers 48, and this structure is shown in detail in Figs. 20, 23 and 24. The end of the lever 8 is provided with a straight edge 8$^a$ which rests on the roller 48, and the flanges on said roller serve as a lateral guide for this straight edge. Adjacent to roller 48 is another roller 59, which cooperates with an upturned straight edge 60$^a$ of another member 60. Member 60 is provided with two prongs 60$^b$ and 60$^c$ projecting upwardly through the slots 8$^b$ and 8$^c$, so that the member 60 has a freedom of movement toward or away from its roller. At its upper end the prongs are fastened to a member 61 by screws 62 and 63; this member extends over the top surface of lever 8 and its purpose is to retain member 60 in connection with the lever 8 and to take the reaction of two compression springs 64 and 65. These springs tend to lift member 60 and press its edge 60$^a$ against the roller 59 and against the pressure exerted by edge 8$^a$ against roller 48. Thus, the straight edge 8$^a$ may be moved longitudinally upon the roller 59 and it will be held continuously in contact with it by the force exerted on the other roller by the edge 60$^a$. The opposed forces on the rollers also effectively prevent the transmission of any lost motion to the lever 8.

Referring now to Figs. 6 and 7, if the shafts 9 and their respective levers 8 are in connection with corresponding rollers in the manner described, then if the supports 14 and 15 of the reflector shafts revolve in unison with the supports 52 and 53 for the rollers, then the shafts 9 will be continuously rotated with respect to their supports, and the compensating reflectors 6, (which are rigidly fastened to the shafts) will receive, simultaneously with their movement of translation, a rotary motion imparted to them through the levers 8. In this system of optical compensation, it is the angular relation of the adjacent reflectors in the active zone, which is most important, and this angular relation depends upon the relative positions of the shafts, the length of the levers and positions of the rollers. By varying the positions or the path of the rollers, a corresponding variation in the angular relation of the reflectors can be produced. The path of the rollers corresponding to the active zone may be circular and in that case the rollers would be fixed about the axis of revolution; but in general a more compact arrangement will result if the active path of the rollers is not a concentric arc about the axis of revolution, and this path is most readily obtained by a cam 57. The angular relation of adjacent reflectors depends upon the focal length of the objective and the apparatus may readily be adapted to objectives of different focal lengths by the substitution of a corresponding cam.

The rotatable supports 15 and 52 are connected by three parallel links 66, 67 and 68 (Figs. 6 and 7) which connect with the elongated arms 15$^b$ and 52$^c$ of these supports respectively.

Figure 9:
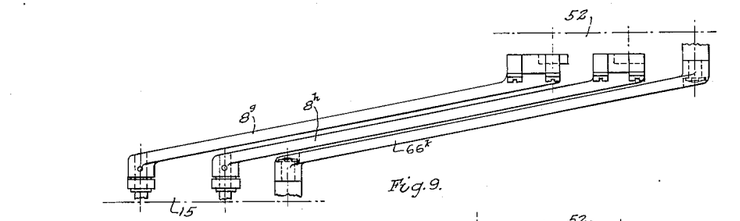
Fig. 9 is a partial top view of a parallel link and two lever arms which determine the angular relations of the compensating reflectors.
Figure 10:
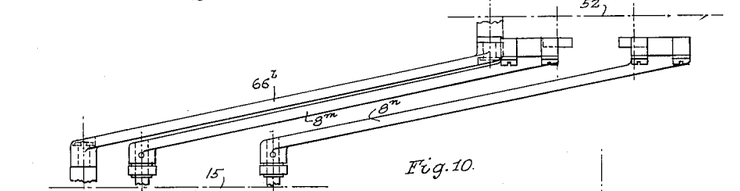
Fig. 10 is a partial top view of the same elements shown in Fig. 9, but in a different operative position.
Figure 11:
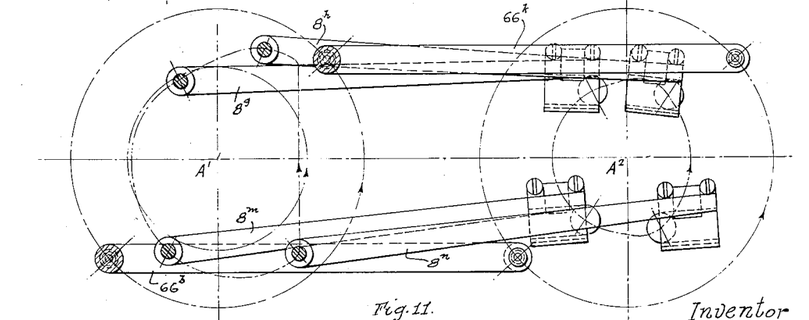
Fig. 11 is a diagrammatic front view of the elements shown in Figs. 9 and 10.

The parallel links furnish a simple and precise means for transmitting movement from one support to the other and the problem in this connection is, to so arrange the parallel links and the lever arms of the shafts, that no interference shall occur between any of the lever arms or parallel links. In Fig. 11, 8$^g$, 8$^h$ and 66$^k$ diagrammatically represent two adjacent levers and a parallel link in an overlapping position, and interference is avoided as shown in Fig. 9; again, in Fig. 11, 66$^b$, 8$^m$ and 8$^n$ represent the overlapping position the same members assume below the axis A$^1$ and A$^2$, and Fig. 10 shows how interference is again avoided. It will be observed that by axially offsetting the supports 15 and 52 the distance between the parallel shafts, and the lengths of the lever arms may be increased indefinitely without producing interference, which feature is of great importance for producing precision of movements of the connected parts.

The compensating reflectors as shown in Figure 6, or diagrammatically on the left side of Fig. 1, continuously face in the same general direction. From Figs. 10 and 11 it will be seen that the effective lengths of the lever arms are approximately equal to the distance between the axes A$^1$ and A$^2$, which is determined by the degree of precision required in any particular case.

Figure 24:
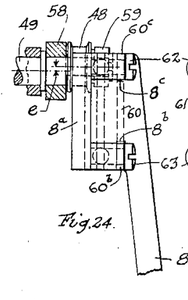
Fig. 24 is a top view of Fig. 23.

It will be apparent from the foregoing that the mechanism herein provided is particularly adapted to produce a movement of a high degree of precision for the compensating reflectors, in the active zone. To obtain precision in the angular relation of adjacent reflectors, it is desirable to provide an adjustment whereby the initial position of the lever arms 8 may be adjusted relative to the rollers 48. In Fig. 24 the rod 49 supporting the rollers 48 and 59 is shown eccentrically offset by the amount $e$; the rod 49 is concentric with roller 58, but eccentric with the rollers 48 and 59, so that turning the rod 49 in its supporting bracket 50 will not disturb it relative to the cam 57, but will change the position of the rollers 48 and 59 and thereby the position of the lever arms 8. Thus by adjusting the rod 49 relative to its supporting bracket 50, the initial position of adjacent reflectors may be varied. The structure of the adjusting means is shown in Figs. 20 and 22. The rod 49 is provided with a groove at one end which in cooperation with a pin 69 in the bracket 50 (Fig. 20) prevents axial movement of said rod in its bracket 50. A blade 70 is fastened to the rod 49 by a screw 71 (Figs. 20 and 22). A stud 72 secured to the blade 70, projects through a hole in the bracket 50 and is provided with a spring 73 and washer 74 which serve to hold the free end of the blade 70 against the shaft 51. By means of a screw 75, in the shaft 51, and opposite the blade 70, the rod 49 may be turned, and thereby a change in the initial position of the compensating reflectors effected.

It is well known in the art that the spacings of adjacent picture images vary somewhat with different films and in optical projectors a corresponding variation between adjacent reflectors must be introduced in the active zone, and simultaneously the angular movement of the reflectors correspondingly modified. In the present invention this can be accomplished by adjusting the position of the cam 57. The cam 57 is provided with elongated slots 57$^a$ and 57$^b$ which cooperate with spring members 76 and 77 (Figs. 19 and 21) which frictionally hold the cam 57 against the flange 55$^b$ by means of the studs 79 and 80. Through the center of the fixed tubular member 56 projects a rotatable rod 81 which is provided at one end with an eccentric projection 80$^a$, and which cooperates with a slot 57$^e$ in the cam. The other end of the rod 81 is provided with a knurled knob 81$^b$ by which said knob may be manipulated and the cam adjusted. A spring 82 pressing upon the flange 81$^c$ of the knob serves to hold said knob in frictional contact with the lug 1$^f$ (Fig. 20).

Referring to Figs. 6 and 7, the path of the light rays are shown directed to the light reflectors 7, (the condensing lenses L and source S are not shown in these figures), to the lens $L_1$, fixed reflector $T_1$, and other fixed reflector $T_2$, lens $L_2$, film F at the film gate, the totally reflecting prism $T_3$, objective O and the compensating reflectors 6, and the picture rays finally pass through the opening 1$^k$ to the screen. The actual operation of the device follows according to the description already given in connection with the diagrams 1 to 5.

The principles herein described may also be applied to a camera.

What I claim is:

1. In an optic projector, a source of light; a series of reflectors mounted to move transversely through the field of light; a film picture aperture, and a series of compensating reflectors; a lens of a predetermined focal length, and positioned between the reflectors and the film picture aperture so as to project an image of the reflectors substantially in superposition upon the film pictures at the aperture, means for imparting to the reflectors a tilting movement during the time they move through the field of light, for projecting an image of the source substantially upon corresponding compensating reflectors, and means for moving the reflectors and the film pictures in synchronism.

2. In an optic projector, a source of light; a series or reflectors mounted to move transversely through the field of light; a film picture aperture, and a series of compensating reflectors; a lens combination consisting of two spaced lens elements having a predetermined focal length, and positioned between the reflectors and the film picture aperture, so as to project an image of the reflectors substantially in superposition upon the film pictures at the aperture; means for imparting to the reflectors a tilting movement during the time they move through the field of light, for projecting an image of the source substantially upon corresponding compensating reflectors, and means for moving the reflectors and the film pictures in synchronism.

3. In an optic projector, a source of light; a series or reflectors mounted to move transversely through the field of light; a film picture aperture embracing a plurality of film pictures; a series of compensating reflectors, and means for moving the reflectors, the film pictures and the compensating reflectors in synchronism; a lens of a predetermined focal length positioned between the reflectors and the film picture aperture, so as to project an image of the reflectors substantially in superposition upon the film pictures at the aperture; means for imparting to the reflectors a tilting movement during the time they move through the field of light, for projecting images of the source substantially upon corresponding compensating reflectors, said compensating reflectors being adapted to project all of the film pictures in the aperture continuously in superposition upon the screen.

4. In an optic projector, a source of light; a series of reflectors provided with alternate color values and mounted to move transversely through the field of light; a film picture aperture, and a series of compensating reflectors; a lens of a predetermined focal length, and positioned between the reflectors and the film picture aperture, so as to project an image of the reflectors in alternate colors, continuously upon corresponding film pictures in the aperture; means for imparting to the reflectors a tilting movement during the time they move through the field of light, for projecting images of the source substantially upon corresponding compensating reflectors, and means for moving the reflectors and the film pictures in synchronism.

5. In an optic projector, a series of compensating optic elements; another series of optic elements adapted to move in synchronism with the film pictures, for directing the light rays upon the film pictures and upon the compensating optic elements; a revolving support, a series of links mounted upon said support, and means for pivotally supporting both series of optic elements upon said links; a cam cooperating with said links for moving the optic elements in predetermined paths; a lever arm for each of said optic elements, and a separate cam for each series of optic elements cooperating with said lever arms.

6. In an optic projector in combination with a series of compensating reflectors, another series of reflectors for directing the light rays upon the film pictures and upon the compensating reflectors; a revolving support; a series of links mounted upon said support and means for pivotally supporting both series of reflectors upon said links; a cam cooperating with said links for moving the reflectors in predetermined paths; a lever arm for each of the reflectors, and a separate cam for each series of reflectors cooperating with said lever arms.

7. In an optic projector, a series of reflectors; a support for said reflectors adapted to revolve about a fixed axis; pivotal means for mounting the reflectors upon said support, and a lever arm for each one of said reflectors; said lever arms being angularly offset relative to the axis of said pivots, so as to permit any two lever arms of indefinite lengths to pass one another without interference, a cam having its axis parallel to the axis of said revolving support, and means cooperating with said cam for guiding the ends of said lever arms.

8. In an optic projector, a support revolving about a fixed axis; a series of reflectors rotatably mounted upon said support and a lever arm for each one of said reflectors; a cam cooperating with the free end of said lever arms, for causing the reflectors to continuously face in the same general direction during the revolution of said reflectors with said support.

9. In an optic projector, a support adapted to revolve about a fixed axis, a series of links pivotally mounted upon said support; a reflector mounted for rotation on each one of said links, said reflector and its axis of rotation being parallel to the fixed axis of the revolving support, and means for actuating said links to cause the reflectors to travel in a fixed path, a lever arm for each of said reflectors, and means cooperating with the lever arms for imparting a tilting motion to said reflectors, during their passage through the active zone.

10. In an optic projector, a support adapted to revolve about a fixed axis; a series of links pivotally mounted upon said support; a shaft parallel to the fixed axis, and mounted for rotation upon each one of said links; a relatively fixed cam cooperating with said links and another cam cooperating with said shafts for causing the shafts to move in a predetermined path; a compensating reflector fixed to each one of said shafts, a lever arm for each one of said reflectors, a cam cooperating with said lever arms, for imparting a tilting motion to said reflectors during their passage through the active zone, the reflectors and said shafts remaining continuously parallel to the fixed axis of the revolving support.

11. In an optic projector, a linkage mechanism consisting of two pivotally connected links; a reflector holder mounted for rotation upon one of said links; a support revolving about a fixed axis, upon which is pivotally mounted a plurality of said linkage mechanisms; means for alternately moving the two links relative to said support, for guiding the reflector holders in a predetermined path; a lever arm for each one of said reflector holders, and means cooperating with said lever arms, for guiding the reflectors at definite angles of inclination relative to the optic axis, while they pass through the active zone.

12. In an optic projector, a plurality of reflector holders; a support for said reflectors adapted to revolve about a fixed axis; pivotal means for mounting the reflector holders upon said support, and a lever arm for each one of said reflector holders; a series of members mounted to revolve about an independent fixed axis, a relatively fixed cam adapted to cooperate with said members, and means connecting each lever arm and a member, for imparting to the reflector holders an independent rotary motion.

13. In an optical projector a series of reflectors adapted to revolve about a fixed axis; a series of shafts for supporting said reflectors and lever arms for each of said shafts; a series of members mounted to revolve about an independent fixed axis, a relatively fixed cam adapted to cooperate with said members, connection between each lever arm and a member and means whereby a revolution about said axes imparts an independent rotary motion to said shafts.

14. In an optical projector, a series of reflectors adapted to revolve about a fixed axis; a series of shafts for supporting said reflectors and lever arms for each of said shafts; a series of members adapted to revolve about an independent fixed axis, a cam cooperating with and guiding said members in a predetermined path and means for adjusting the position of said cam relative to said members; connection between each lever arm and a member and means whereby movement about said axes imparts an independent rotary motion to said shafts.

15. In an optical projector, a series of reflectors adapted to revolve about a fixed axis; a series of shafts for supporting said reflectors and lever arms for each of said shafts; a series of members adapted to revolve about an independent fixed axis and a cam for guiding said members in a predetermined path; connection between each lever arm and a member, means for moving the reflectors and said members in unison, and an independent adjusting means provided for each one of said members.

16. In an optic projector, a support revolving about a fixed axis; a series of reflectors rotatably mounted upon said support, and a lever arm for each one of said reflectors; a cam having its axis parallel to the axis of the revolving support, the distance between said axes being approximately equal to the length of said lever arms, and means cooperating with said cam for guiding the lever arms in predetermined paths.

17. In an optic projector, a support revolving about a fixed axis; a series of reflectors rotatably mounted upon said support, and a lever arm for each one of said reflectors; a cam; a series of members adapted to be actuated by said cam; means connecting each lever arm and a member for imparting a predetermined inclination to said reflectors, and means for independently adjusting each lever arm relative to its corresponding member.

18. In an optical projector, a support adapted to revolve about a fixed axis; a series of reflectors mounted for rotary motion upon said support, and a lever arm for each one of said reflectors; a series of rollers adapted to revolve about an independent parallel axis; means for moving the reflectors and said rollers in unison about their respective axes and connecting means between each lever arm and a corresponding roller.

NICHOLAS MILLER.